United States Patent
Jin et al.

(10) Patent No.: US 7,671,863 B2
(45) Date of Patent: Mar. 2, 2010

(54) METHOD AND GRAPHIC ENGINE CHIP FOR DRAWING PROCESSING

(75) Inventors: Chuanen Jin, Beijing (CN); Chunquan Dai, Beijing (CN)

(73) Assignee: Vimicro Corporation, Beijing (CN)

( * ) Notice: Subject to any disclaimer, the term of this patent is extended or adjusted under 35 U.S.C. 154(b) by 564 days.

(21) Appl. No.: 11/368,816

(22) Filed: Mar. 6, 2006

(65) Prior Publication Data

US 2006/0248543 A1   Nov. 2, 2006

(30) Foreign Application Priority Data

Mar. 8, 2005   (CN) .................... 2005 1 0053559

(51) Int. Cl.
  *G06T 15/00* (2006.01)
(52) U.S. Cl. .................... 345/502; 712/28; 712/30
(58) Field of Classification Search ............ 345/502; 358/1.1, 1.15; 719/323; 712/28, 29, 30; 713/1, 2, 100

See application file for complete search history.

(56) References Cited

U.S. PATENT DOCUMENTS

| | | | | | |
|---|---|---|---|---|---|
| 4,847,755 | A | * | 7/1989 | Morrison et al. | 712/203 |
| 5,021,945 | A | * | 6/1991 | Morrison et al. | 712/216 |
| 5,517,628 | A | * | 5/1996 | Morrison et al. | 712/234 |
| 6,654,139 | B1 | * | 11/2003 | Yokoe | 358/1.15 |
| 6,844,879 | B2 | * | 1/2005 | Miyauchi | 345/502 |
| 6,976,150 | B1 | * | 12/2005 | Uht et al. | 712/18 |
| 7,126,701 | B2 | * | 10/2006 | Ikeda et al. | 358/1.1 |
| 7,466,316 | B1 | * | 12/2008 | Alben et al. | 345/502 |

* cited by examiner

*Primary Examiner*—Phu Nguyen
(74) *Attorney, Agent, or Firm*—Joe Zheng

(57) ABSTRACT

Architectures for graphic engine chips with minimum impact on other resources are disclosed. According to one embodiment, a graphic engine architecture includes a scheduler that is configured to schedule an execution time for each of the drawing instructions sent in groups from a processor. Each drawing instruction includes a piece of time information. The scheduler is provided to fetch the drawing instructions from a FIFO buffer that buffers the drawing instructions. Subsequently, the drawing instructions are successively executed according to their scheduling.

14 Claims, 2 Drawing Sheets

METHOD AND GRAPHIC ENGINE CHIP FOR DRAWING PROCESSING

BACKGROUND OF THE INVENTION

1. Field of the Invention

The present invention is related to chip designs of integrated circuits, more particularly to designs of graphic engine chips for drawing processing.

2. Description of Related Art

Graphic engine chips are used in ICs (integrate circuits) to help a processor, such as CPU, to expedite processing of drawing. A conventional graphic engine architecture in an IC is shown in FIG. 1. The graphic engine chip includes a GE CMD FIFO (Graphic Engine Command First-in First-out buffer) 100, a GE (Graphic Engine) 101, a display memory 102, a display controller 103, a GE memory 105, and a DMA (Direct Memory Access) controller 106. The GE CMD FIFO 100, the GE 101, the display memory 102, and the display controller 103 are coupled one after another. After coupling the GE memory 105 with the DMA controller 106, the one terminal of the GE memory 105 is coupled to the GE 101 and the other terminal of the DMA controller 106 is connected to the display memory 102.

In order to further understand the conventional Graphic Engine chip, a working process of the graphic engine chip is provided in FIG. 2. At 200, the processor is configured or caused to send drawing instructions to the GE CMD FIFO 100. The GE CMD FIFO 100 receives and buffers the drawing instructions therein at 201. When the GE 101 is free, it fetches at 202 the drawing instructions buffered in the GE CMD FIFO 100 in accordance with a sequence of the instructions received in the GE CMD FIFO 100.

At 203, the GE 101 executes the fetched instructions to edit drawing data in the display memory 102. Lots of calculations are needed when the GE 101 executes these drawing instructions. Hence, it requires the GE memory 105 to preserve the drawing data in the GE 101 temporarily. The display memory 102 at 204 preserves the edited drawing data and exports them to the displayer 104 by means of controlling of the display controller 103. At 205, a displayer 104 displays pictures in accordance with the received drawing data.

The DMA controller 106 may be used to control transmission of the drawing data when a large set of the drawing data needs to be transmitted between the display memory 102 and the GE 101. In this way, the drawing data can be transmitted from the GE memory 105 to the display memory 102 via the DMA controller 106, thereby saving the source of the GE 101.

It can be noted in the conventional graphic engine architecture and its applications that the drawing instructions sent by the processor do not contain time information. The GE CMD FIFO 100 buffers the drawing instructions one after another sequentially. Accordingly, the GE 101 executes the drawing instructions sequentially in the GE CMD FIFO 100. A whole drawing process, however, requires many executions of the instructions in the graphic engine chip operating according to predefined time intervals. However, a time interval between every two drawing instruction executions can not be controlled by the graphic engine chip. Thus, the processor has to send instructions per time intervals so that the executing time of the drawing instructions can be controlled.

For this reason, in order for the GE to execute every drawing instruction properly in time and at the same time not to be interrupted, it is often required that the processor controls the execution time of each drawing instruction and sends the drawing instructions on time. This increases the interruption and reduces the working efficiency of the processor.

In summary, the conventional graphic engine chip and its applications have at least some of the following disadvantages. Firstly, the underlying architecture can cause a processor connected to the graphic engine chip, CPU for instance, to respond to the graphic engine chip too frequently and thus increases the loading of the processor. Secondly, the time accuracy of the drawing process by the graphic engine chips depends on the response of the processor, thus difficult to control the whole drawing process accurately.

Thus there is a need for an efficient graphic engine architecture that impacts less on a processor coupled thereto.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to graphic engine architectures. Integrated circuits (IC) so designed shall have minimum impacts on other resources (e.g., a micro processor) in a device. According to one aspect of the present invention, a graphic engine integrated circuit comprises a GE CMD FIFO (Graphic Engine Command First-in First-out buffer), a scheduler and a GE (Graphic Engine). The GE CMD FIFO is provided to receive and store a plurality of drawing instructions. Each of the drawing instructions includes a piece of time information. The scheduler is provided to fetch the drawing instructions successively from the GE CMD FIFO and schedule the drawing instructions according to the embedded time information so that an execution time of each drawing instruction can be determined. Subsequently, the GE executes the drawing instructions successively according to their scheduling.

The present invention may be implemented in an integrated circuit, a device or a part of a system. According to one embodiment, the present invention is a graphic engine architecture that comprises a FIFO buffer for receiving a plurality of drawing instructions, each of the drawing instructions including a piece of time information; a scheduler for fetching the drawing instructions successively from the FIFO buffer, and scheduling the drawing instructions for execution according to the time information therein so that each drawing instruction is executed at an appropriate time; and a graphic engine configured to execute the drawing instructions successively according to scheduling by scheduler.

According to another embodiment of the present invention, the present invention is a method embedded in an integrated circuit for drawing processing, the method comprises receiving a plurality of drawing instructions that are buffered in a FIFO buffer, each of the drawing instructions including a piece of time information, fetching the drawing instructions successively and scheduling in a scheduler respective execution times of the drawing instructions according to their respective time information so that each of the drawing instructions is timely executed, and executing the drawing instructions successively according to scheduling determined by the scheduler.

One of the objects, features, and advantages of the present invention is to provide an efficient graphic engine.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
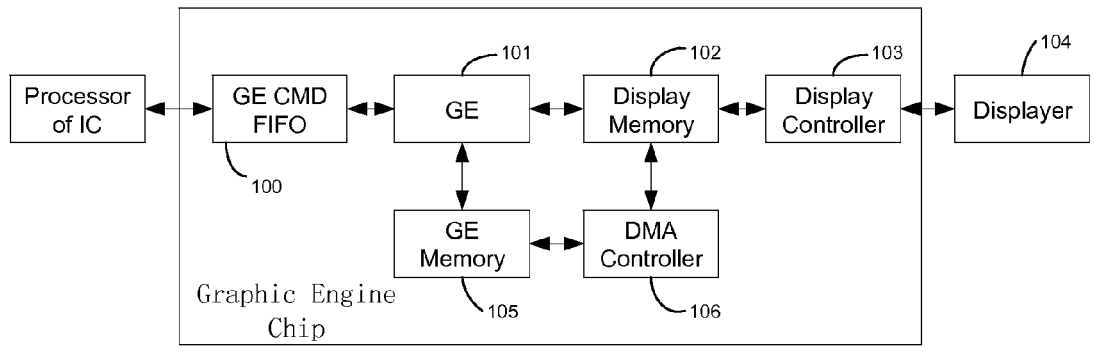
FIG. 1 is a block diagram showing a conventional graphic engine architecture.
Figure 2:
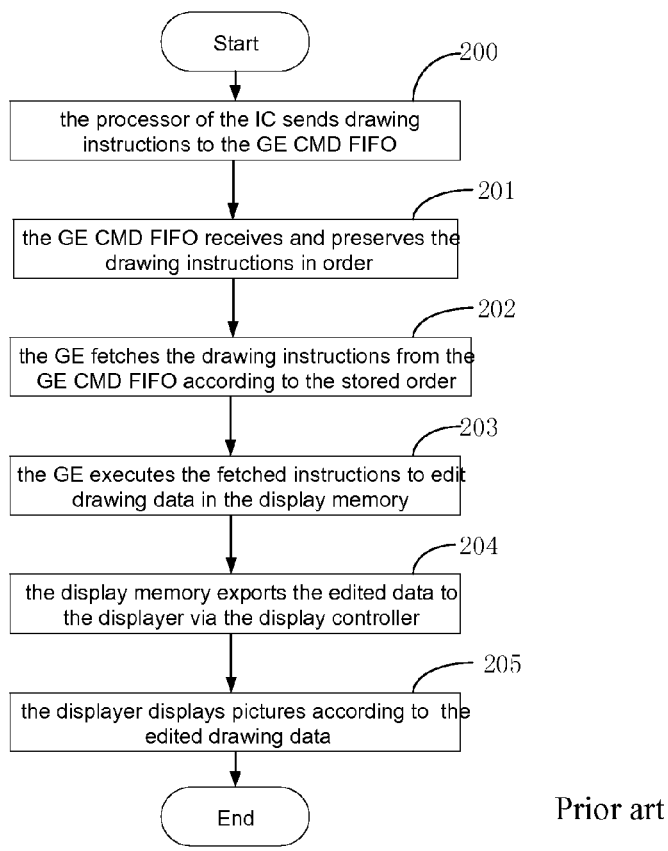
FIG. 2 is a flowchart for operations of the conventional graphic engine architecture shown in FIG. 1.
Figure 3:
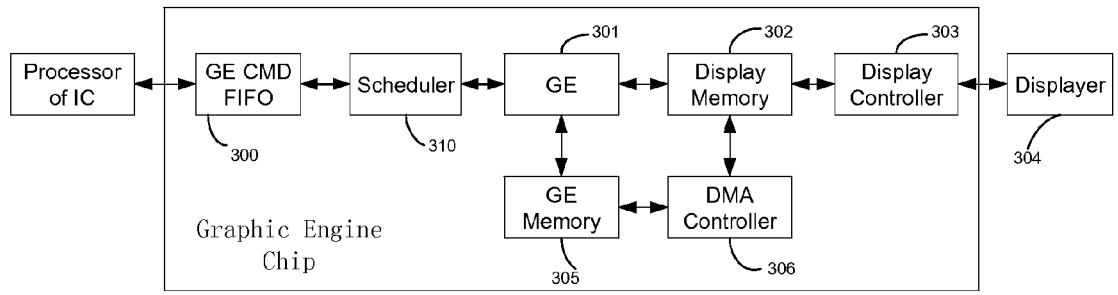
FIG. 3 is an exemplary block diagram showing a graphic engine architecture according to one embodiment of the present invention.

Referring now to the drawings, in which like numerals refer to like parts throughout several views. FIG. 3 shows an architecture of graphic engine that may be used in an integrated circuit to facilitate drawing on a display. As shown in FIG. 3, the graphic engine includes a GE CMD FIFO (Graphic Engine Command First-in First-out buffer) 300, a scheduler 310, a GE (Graphic Engine) 301, a display memory 302, a display controller 303, a displayer 304, a GE memory 305 and a DMA controller 306. Different from FIG. 1, the scheduler 310 is provided and coupled between the GE CMD FIFO and the GE 301.

The GE CMD FIFO 300 is adapted for receiving and buffering a sequence of drawing instructions from a processor, such as a CPU. Different from the prior art, each drawing instruction contains time information. In one embodiment, the time information may be a time interval, such as a time interval between the execution time of one drawing instruction and the execution time of its previous one. In another embodiment, the time information may include a time point, such as an execution time point of each drawing instruction.

The scheduler 310 is configured to fetch the drawing instructions from the GE CMD FIFO 300 one after another, scheduling the drawing instructions according to their time information. The GE 301 is provided to execute the drawing instructions one after another in accordance with the scheduling of the scheduler 310 to edit drawing data in the display memory 302 successively. The display memory 302 buffers the modified drawing data successively and exports the buffered drawing data to the displayer 304 by means of controlling of the display controller 303. The displayer 104 is provided to display the received drawing data.

Figure 4:
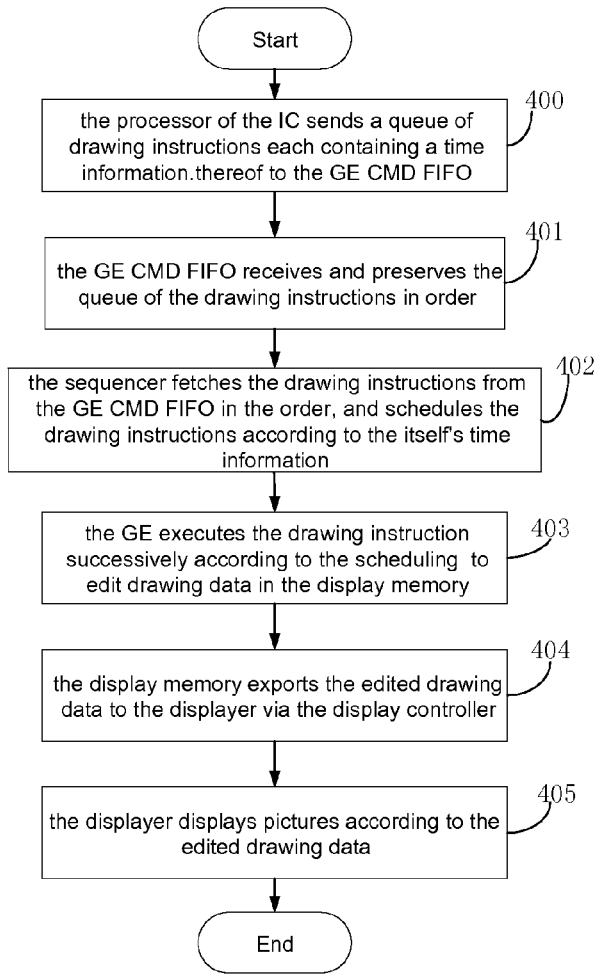
FIG. 4 is a flowchart showing operations of the graphic engine architecture shown in FIG. 3.

In order to further understand the graphic engine chip in the present embodiment, a drawing process of the graphic engine architecture is shown as a flowchart in FIG. 4. At 400, a processor sends a sequence of drawing instructions to the GE CMD FIFO 300. Each drawing instruction includes a piece of time information. The time information may be a time interval, such as a time interval between two execution times of one drawing instruction and its previous one. In one embodiment, the time information may be a time point at which time a drawing instruction shall be executed.

At 401, the GE CMD FIFO 300 receives and buffers the sequence of the drawing instructions in order. The scheduler 310 fetches the drawing instructions at 402 from the GE CMD FIFO 300 according to the order, and then schedules the drawing instructions according to their time information to determine the execution time of each drawing instruction.

At 403, the GE 301 executes the drawing instructions successively according to the scheduling of the scheduler 310 to edit drawing data in the display memory 102. When the GE 301 executes the drawing instructions, to facilitate a large amount of calculations that may be involved in, the GE memory 305 is provided to buffer the drawing data temporarily.

At 404, the display memory 302 is provided to store the edited data and exports the edited data to the displayer 304 by means of controlling the display controller 303. Subsequently, a displayer 304 at 405 displays pictures according to the received drawing data.

When the graphic engine has accomplished all the drawing instructions at this time, it will make a request to the processor for a next sequence of drawing instructions. After the processor sends the drawing instructions, the drawing process shown in FIG. 4 will be repeatedly.

In one embodiment, the DMA controller 306 is used to control the transmission of the drawing data when the drawing data needs to be transmitted between the display memory 302 and the GE 301. In operation, the drawing data can be transmitted from the GE memory 305 to the display memory 302 via the DMA controller 106, thereby saving the resource source of the GE 301.

As described above, it can be noticed that the scheduler 310 is used in the graphic engine architecture as shown in FIG. 3, and the time information is included in each drawing instruction. Thus, the scheduler 310, instead of the processor, schedules the drawing instructions from the GE CMD FIFO 300 so that the GE 301 can successively and timely execute the drawing instructions in accordance with the scheduling. Therefore, the processor in an IC designed in accordance with the present invention no longer needs to frequently send time intervals of the drawing instructions, thereby greatly reducing the response frequency of the graphic engine and improving its operating efficiency. Furthermore, the processor is now configured to send drawing instructions in groups, instead of one by one, thereby further improving its operating efficiency.

Because each drawing instruction in a queue carries embedded time information, the scheduler 300 determines an execution time for each drawing instruction and informs the GE 301 when to execute corresponding instructions. Therefore, the graphic engine can precisely control the drawing time during the whole process of the drawing.

It is known that cartoons are formed by playing a group of graphs timely. A graph engine chip designed in accordance with the present invention can be advantageously adapts to play the cartoons. Exemplary embodiments are provided below to show some applications of a graph engine chip so designed according to the present invention.

In a portable multi-media device, the processor of the portable multi-media device is usually responsible for many tasks and it can hardly cope with graph management. Thus a graph engine chip is required to cope with this task. A cartoon playing process in the portable multi-media device may be regarded as executions of many drawing instructions in accordance with respective predefined time intervals.

In operation, the processor of portable multi-media device adds time information to the drawing instructions and sends a queue of the drawing instructions with time stamps to the GE CMD FIFO 300. After accomplishing the sending operation, the processor can cope with other tasks. The scheduler 310 of the graphic engine chip takes over to fetch the drawing instructions in the queue, and determine the execution time point of each drawing instruction according to the embedded time information. The drawing instruction is then sent to the GE 301 at their corresponding execution time. The GE 301 executes received drawing instructions, possibly buffering the processed data in the display memory 302. Subsequently, the displayer 304 displays pictures according to the received drawing data from the display memory 302.

A graph engine chip in accordance with the present invention may be applied in electronic devices that have displays and require the function of data drawing. Exemplary such electronic devices may include, but not be limited to, a computer, a PDA (personal digital assistant) and a portable device.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A graphic engine architecture comprising:
    a FIFO buffer for receiving a plurality of drawing instructions, each of the drawing instructions including a piece of time information indicating when the each of the drawing instructions shall be executed;
    a scheduler for fetching the drawing instructions successively from the FIFO buffer, and scheduling the drawing instructions for execution according to the time information therein so that each drawing instruction is executed accordingly; and
    a graphic engine configured to execute the drawing instructions successively according to scheduling by scheduler.

2. The graphic engine architecture as claimed in claim 1, wherein the time information in each of the drawing instruction further includes a time interval that dictates a time period between one drawing instruction and another drawing instruction.

3. The graphic engine architecture as claimed in claim 1, wherein the graphic engine executing the drawing instructions one after another in accordance with the scheduler to edit drawing data in a display memory successively.

4. The graphic engine architecture as claimed in claim 1, wherein the drawing instructions are sent from a processor to the FIFO buffer in groups.

5. The graphic engine architecture as claimed in claim 1, further comprising a display memory for storing drawing data, wherein the graphic engine is configured to edit drawing data according to the drawing instructions, and wherein the edited drawing data is stored in the display memory.

6. The graphic engine architecture as claimed in claim 5, further comprising a display controller via which the edit drawing data is outputted thereto.

7. The graphic engine architecture as claimed in claim 5, further comprising a memory for buffering the edited drawing data.

8. The graphic engine architecture as claimed in claim 7, further comprising a DMA controller for controlling transmission of the edited drawing data between the memory and the graphic engine.

9. A method embedded in an integrated circuit for drawing processing, the method comprising:
    receiving a plurality of drawing instructions that are buffered in a FIFO buffer, each of the drawing instructions including a piece of time information indicating when the each of the drawing instructions shall be executed;
    fetching the drawing instructions successively and scheduling in a scheduler respective execution times of the drawing instructions according to their respective time information so that each of the drawing instructions is executed accordingly;
    executing the drawing instructions successively according to scheduling determined by the scheduler.

10. The method as claimed in claim 9, wherein the time information in each of the drawing instruction is a time interval that dictates a time period between one drawing instruction and another drawing instruction.

11. The method as claimed in claim 9, wherein the graphic engine executes the drawing instructions one after another in accordance with the scheduler to edit drawing data in a display memory successively.

12. The method as claimed in claim 9, wherein the drawing instructions are sent from a processor to the FIFO buffer in groups.

13. The method as claimed in claim 9, further comprising:
    storing drawing data in a memory, wherein a graphic engine is configured to edit the drawing data according to the drawing instructions, and wherein the edited drawing data is stored in the display memory.

14. The method as claimed in claim 13, further comprising: transmitting the edited drawing data between the memory and a graphic engine via a DMA controller.

* * * * *